(12) United States Patent
Pinto et al.

(10) Patent No.: US 9,228,040 B2
(45) Date of Patent: Jan. 5, 2016

(54) CNSL-BASED HYDROCARBON RESINS, PREPARATION AND USES THEREOF

(71) Applicant: CARDOLITE CORPORATION, Newark, NJ (US)

(72) Inventors: Mauricio Pinto, North Brunswick, NJ (US); Hong Xu, Montgomery, NJ (US); Anbazhagan Natesh, North Wales, PA (US); Junhong Wei, Guangdong (CN)

(73) Assignee: Cardolite Corporation, Newark, NJ (US)

( * ) Notice: Subject to any disclaimer, the term of this patent is extended or adjusted under 35 U.S.C. 154(b) by 0 days.

(21) Appl. No.: 14/509,473

(22) Filed: Oct. 8, 2014

(65) Prior Publication Data

US 2015/0099851 A1    Apr. 9, 2015

Related U.S. Application Data

(60) Provisional application No. 61/888,209, filed on Oct. 8, 2013.

(51) Int. Cl.
  *C08G 63/78*    (2006.01)
  *C08F 216/10*    (2006.01)
  *C08G 63/87*    (2006.01)

(52) U.S. Cl.
  CPC .................. *C08F 216/10* (2013.01)

(58) Field of Classification Search
  USPC .................. 528/1, 3, 205; 523/156, 157, 158
  See application file for complete search history.

(56) References Cited

U.S. PATENT DOCUMENTS 2,264,373 A * 12/1941 Harvey .................. 106/252
2,502,003 A    3/1950 Geiger
3,074,902 A    1/1963 Pfau
3,407,147 A    10/1968 Chew
2011/0189250 A1 * 8/2011 John et al. .................. 424/405

FOREIGN PATENT DOCUMENTS

GB        636694        5/1950

OTHER PUBLICATIONS

Nimura, et al., Characterization of Natural Resin Films and Identification of Ancient Coating J. Mass Spectrom. Soc. Jpn. 51(4): 439-457, 2003. [retrieved on May 12, 2014]. Retrieved from the Internet. <URL: http://www.bunken.org/mssj/search/pdf/200304/ms510439.pdf> entire document.
International Search Report and Written Opinion of the International Searching Authority for International Application No. PCT/US2014/059649, mailed Jan. 13, 2015.

* cited by examiner

*Primary Examiner* — Terressa Boykin
(74) *Attorney, Agent, or Firm* — McCarter & English, LLP

(57) ABSTRACT

The present invention is directed to resins made from cashew nutshell liquid and vinyl hydrocarbons and processes for manufacturing the resins. These resins exhibit lower viscosity than the phenol-based homologs. They also exhibit good compatibility with a wide range of solvents, mineral and natural oils, epoxy curing agents, liquid epoxy resins, and polymers, which make them suitable additives as non-reactive diluents for solvent-free coating formulations; tackifiers for structural adhesive, pressure sensitive and hot-melt adhesives; stabilizers for lubricants, fuel and polymer formulations; plasticizers for thermoplastic polymers and processing aid for rubber compounding and stabilizers for respective rubber artifacts. These resins are also valuable precursors for the manufacture of epoxy resins and polyols for coating, adhesive and composite formulations exhibiting ameliorated performance in water repellency, anti-corrosion, and fast hardness development during cure.

23 Claims, 4 Drawing Sheets n = 1, 2 or 3

R = H, Styrene or R = -CH₃, alpha-methylstyrene

CNSL-BASED HYDROCARBON RESINS, PREPARATION AND USES THEREOF

RELATED APPLICATIONS

This application claims priority to U.S. Provisional Patent Application No. 61/888,209 filed on Oct. 8, 2013, the contents of which are incorporated herein by reference in their entirety.

FIELD OF THE INVENTION

The invention generally relates to resins made from cashew nutshell liquid and vinyl hydrocarbons, and processes for manufacturing the resins.

BACKGROUND OF THE INVENTION

Phenol-modified hydrocarbon resins are widely used in coatings and adhesive formulations, and also widely used in the manufacturing of rubber products. These resins improve the compatibility of the ingredients in such formulations. In addition, the resins provide improved chemical and weathering resistance to finished products designed to perform under harsh environmental conditions, such as wide variation of temperature, oxidation by air, and light exposure. Other advantages include the substantial improvement of the adhesive properties in coating and adhesive formulations.

Phenol-modified hydrocarbon resins encompass a wide range of products produced by the reaction between phenols and vinyl aliphatic and aromatic monomers. In general, the composition of these resins is quite complex, which can be simply characterized by a mixture of monomeric and polymeric components bearing distinct chemical functionalities. For instance, the reaction of unsubstituted phenol with vinyl hydrocarbon monomers, such as styrene, alpha-methylstyrene, vinyltoluene, indene, coumarone, or any other similar vinyl monomers, or a mixture thereof, catalyzed by strong acids, produces liquid to wax-like resins containing variable amounts of short polymers of vinyl monomers, in addition to the alkylated phenol components. The polymer fraction is mostly composed of cyclic dimers and trimers of the vinyl monomers, with small amounts of respective linear oligomers. The alkylated phenol fraction is also multicomponent, as it contains variable amounts of monosubstituted, disubstituted, and trisubstituted phenolic compounds. The compositions of these resins can be controlled by careful adjustments of the reaction conditions. However, the most significant factor to control the desired physico-chemical properties is the judicial selection of structural variations on the phenol and on the vinyl hydrocarbon monomer building blocks. Mixtures of phenols and/or vinyl monomers are very often employed to achieve the right balance of polarity, solubility, and fluidity, which is intimately related to the hydroxyl functionality, the content of aromatic, hydrophobic moieties, and polymer fractions, in addition to the molecular weight distribution. For this purpose, it is a common practice to incorporate small portions of an alkyl-substituted phenol to the reaction mixture. The most commonly used alkyl-substituted phenols are ortho- and para-tert-butylphenol, octylphenol, and nonylphenol. These phenols can be produced in-situ, prior to or after the reaction with the intended vinyl monomers. These variations in the process can add cost and complexity to the manufacturing of such resins. In addition, it can be more difficult to stabilize the process and minimize the variability between batches as the number of steps and raw materials are increased.

Cashew nutshell liquid (CNSL) contains a large concentration of cardanol and cardols, a natural source of meta-substituted alkylated phenols and resorcinols. CNSL is relatively low cost, and it is a globally available bio-renewable commodity, which makes it an ideal building block for the manufacturing of phenol-modified hydrocarbons resins. Due to the structure of the components of CNSL, the hydrocarbon resins can be manufactured with fewer steps and/or raw materials.

Among the advantages of cardanol-based hydrocarbon resins are low viscosity, improved solubility with organic solvents, very low cloud points, and compatibility with a great number of resins and polymer formulations.

SUMMARY OF THE INVENTION

The present disclosure relates to resin compositions comprising cardanols obtained from Cashew Nut Shell Liquid (CNSL) and processes for making the resins. In one embodiment, the resins may be comprised of vinylated cardanols and vinylated cardols, wherein the cardanols and cardols are obtained from CNSL, as well as hydrocarbon cyclic dimers. The resin may include one or more additional polymers.

The resin may be manufactured by combining in a reactor vessel a quantity of CNSL, an acid catalyst, and a vinyl monomer, and maintaining the reactor vessel at a predetermined temperature for a predetermined period of time to achieve the desired degree of polymerization. As one skilled in the art will recognize, the proportions of the components to be used, the temperature and the time may be adjusted as desired to achieve a desired degree of polymerization of the components.

The resins may be used in coatings, as tackifiers, and for numerous other products that may use or include hydrocarbon resins.

DESCRIPTION OF THE FIGURES

For a better understanding of the present invention, reference is made to the following detailed description of an exemplary embodiment considered in conjunction with the accompanying drawings.

DETAILED DESCRIPTION OF THE INVENTION

Figure 1:
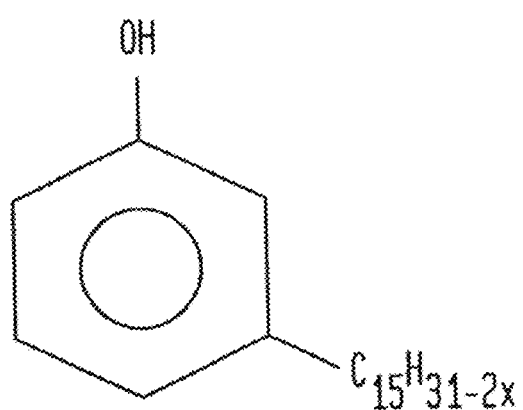
FIG. 1 shows an exemplary cardanol molecule.

In one embodiment, the present disclosure is directed to resins produced by the reaction between Cashew Nut Shell Liquid (CNSL) and respective derivatives with vinyl hydrocarbons. The reaction may be promoted by acid catalysts. These resins are generally comprised of about 20-95% by weight of "vinylated" cardanols and cardols, about 1-40% by weight of hydrocarbon cyclic dimers, and about 0-50% by weight of polymers, which may be a mixture of short chains composed of vinyl hydrocarbon monomers and cardanol units, with degree of polymerization of no less than 2 and no more than 10 repeating monomer units.

In certain embodiments, the CNLS hydrocarbon resins comprise about 20%, 25%, 30%, 35%, 40%, 45%, 50%, 55%, 60%, 65%, 70%, 75%, 80%, 85%, 90% or 95% by weight of vinylated cardanols and vinylated cardols. Any of these values may be used to define a range for the percent by weight of the vinylated cardanols and vinylated cardols depending on the application. For example, the amount of vinylated cardanols and vinylated cardols in the CNSL hydrocarbon resin may range from about 25% to about 90% by weight, from about 30% to about 85% by weight, or from about 40% to about 80% by weight.

In certain embodiments, the CNLS hydrocarbon resins comprise about 1%, 2%, 3%, 4%, 5%, 10%, 15%, 20%, 25%, 30%, 35%, or 40% by weight of hydrocarbon cyclic dimers. Any of these values may be used to define a range for the percent by weight of the hydrocarbon cyclic dimers. For example, the amount of hydrocarbon cyclic dimers in the CNSL hydrocarbon resin may range from about 5% to about 35% by weight, from about 10% to about 30% by weight, or from about 15% to about 25% by weight.

In certain embodiments, the CNLS hydrocarbon resin comprises vinylated cardanols, vinylated cardols, and hydrocarbon cyclic dimers, and does not comprise any additional polymers. In other embodiments, the CNLS hydrocarbon resin comprises about 1%, 2%, 3%, 4%, 5%, 10%, 15%, 20%, 25%, 30%, 35%, 40%, 45%, 50%, 55%, 60%, 65% or 70% by weight of one or more additional polymers. Any of these values may be used to define a range for the percent by weight of additional polymers. For example, the percent by weight of one or more additional polymers in the CNLS hydrocarbon resin may range from about 1% to about 70%, from about 5% to about 45%, or from about 10% to about 40%. In certain embodiments, the one or more additional polymers are linear oligomers of vinyl hydrocarbon monomers and cardanols, with a degree of polymerization of 2, 3, 4, 5, 6, 7 8, 9, or 10 repeating monomer units. Any of these values may be used to define a range for the degree of polymerization of the additional polymers. For example the degree of polymerization of the additional polymers may range from 2 to 10, 3 to 9, or 4 to 8 repeating monomer units.

In another embodiment, non-purified CNSL is reacted with vinyl hydrocarbon monomers to make CNSL-based hydrocarbon resins. Non-purified CNSL is the raw product originated from the extraction process of the cashew shells. Depending upon the extraction procedure, the non-purified CNSL may contain relatively large amounts of cardols compared to purified CNSL. Also, depending upon the source, the total amount of cardols in non-purified CNSL can be as high as 25% by weight. Non-purified CNSL may contain large amounts of cardol and cardanol oligimers. The polymerization of cardols and cardanols can occur slowly under normal environmental conditions, although it can be accelerated by high temperature treatment, or it may be caused by oxidation processes during the CNSL extraction procedure. Also, depending upon the process of extraction, anacardic acid can be present in relatively high concentrations. The advantage of using non-purified CNSL is the lower cost of the raw material. The resins derived from non-purified CNSL can contain relatively high amounts of polymer, between about 5-35% by weight of the total resin. In certain embodiments, the resins derived from non-purified CNSL contain about 5%, 10%, 15%, 20%, 25%, 30% or 35% polymer by weight of the total resin. Any of these values may be used to define a range for the percentage of polymer in the resin. For example the percentage of polymer in the resin may range from about 10% to about 30%, about 15% to about 30%, or about 20% to about 25% of the total resin. The main advantages of hydrocarbon resins made with non-purified CNSL are related to their low migration, high hydrophobicity, and tackifier features. The most appropriate applications are additives for sealants, building materials, structural adhesives, and in manufacture of compounded rubber products.

In another embodiment, purified CNSL is reacted with vinyl hydrocarbon monomers to make CNSL-based hydrocarbon resins. Depending upon the purification procedure, the purified CNSL will contain reduced amounts of cardols, preferably below about 5%, and very low content of polymer species, preferably no more than about 2%. Also, anacardic acid is substantially completely removed from the CNSL. The major components of purified CNSL are the cardanol isomers, which are differentiated by the number of carbon double bonds on the side chain, as shown in FIG. 1 and described in U.S. Pat. No. 6,229,054, the contents of which are hereby incorporated by reference in their entirety. The total cardanol content is typically about 80 to 99% by weight, and is preferably about 85-99%, about 90-99% or about 95-99% by weight. The hydrocarbon resins made with purified CNSL are light colored, and exhibit low viscosity. The content of vinylated cardanols in the resins is typically about 20-99% by weight, and preferably about 50-95%, about 60-95%, about 70-95%, or about 80-95% by weight. Among the advantages of hydrocarbon resins made with purified CNSL are their light color, and anti-oxidant properties. These resins are particularly useful for coatings applications.

In yet another embodiment, highly purified CNSL is used. Depending upon the purification procedure, highly purified CNSL may contain only trace amounts of cardols, and essentially no polymer components and anacardic acids. They are essentially very pure cardanol mixtures, composed of only cardanol isomers which are differentiated by the number of carbon double bonds on the side chains. The total cardanol content is typically about 96% to 100% by weight, and preferably about 97% to 99.9%, about 98% to 99.9%, about 99% to 99.9%, or about 99.5% to 99.9% by weight. Depending upon the purification procedure the compositional distribution of the four cardanol isomers may vary greatly. In most cases, the content of cardanols with triene, diene, monoene, and saturated side chains are about 30-45% by weight, about 15-25% by weight, about 30-45% by weight, and about 0-10% by weight, respectively. In special cases, the content of isomers bearing multiple carbon double bonds on the side chains are intentionally depleted by means of physical separation or chemical reactions, to produce CNSL with better oxidation, color stability, and higher thermal transitions. For such purpose, the compositional distribution of cardanol triene, diene, monoene, and saturated isomers are preferably about 0-5% by weight, about 0-10% by weight, about 70-95% by weight and about 0-15% by weight, respectively.

In another embodiment, the distillation residue from the manufacturing process of the purified CNSL or the highly purified CNSL, characterized as a side stream, is also reacted with vinyl hydrocarbon monomers to make hydrocarbon resins. Depending upon the purification procedure, these side streams contain very high amounts of polymer components, high contents of cardols, and very low content of cardanols, and are substantially free of anacardic acids. The polymer content is characterized as a complex mixture of polymerized cardol and cardanols, normally caused by side chain polymerization, mostly through isomerization and cycloaddition reactions. The polymer can also originate from oxidative reactions. The molecular weight of the polymer fraction ranges from about 500 to 10,000 g/mol. The polymer level in this CNSL is about 20-95% by weight, and preferably about 30-80%, 40-70% or 40-60% by weight. The hydrocarbon resins produced using these side streams exhibit very high viscosity and enhanced hydrophobic properties. The resin may be used as a rheology modifier, an impact modifier, a tackifier, a plasticizer, a weathering stabilizer, and/or an anti-oxidant. They may also reduce cracking and brittleness of thermoplastic and thermoset polymer formulations, and the products made from these polymers. Due to the high polymer content of these resins, they may also be used in applications where control of leachates, migration, VOC, and other restrictive regulatory controls are required.

In another aspect, for the purpose of this disclosure, chemically modified CNSL streams are reacted with vinyl hydrocarbon monomers to make CNSL-modified hydrocarbon resins. Suitable chemical modifications can be carried out on the aromatic ring reactive sites, or on the double bonds of the side chains of the cardol, cardanols and anacardic acids components.

Any of the aforementioned purified or non-purified CNSL may react with aldehydes and ketones promoted by acid catalysts to form polymers of the novolac resin type. The same catalyst that converts CNSL substrates to CNSL hydrocarbon resins, can also promote the polycondensation reaction of cardol, cardanols or anacardic acids with aldehydes or ketones. Therefore, the CNSL-novolac-hydrocarbon resins can be made in one single batch process. The process can start with the production in-situ of the hydrocarbon resin, and then the polycondensation reaction is carried out with aldehyde or ketones in a subsequent step. Alternatively, under the same principle, the order of above steps can be reversed, in which case the CNSL-novolac resin is made first as an intermediate, followed by the reaction with the vinyl hydrocarbon monomers in a subsequent step. From the manufacturing perspective, the former manufacturing process is the simplest one, and therefore the preferred one.

Any of the aforementioned types of CNSL may be catalytically reduced with hydrogen under pressure and promoted by active metal catalysts to produce a partially or completely saturated product. This hydrogenated CNSL is allowed to react with vinyl hydrocarbon monomers promoted by acid catalysts to produce CNSL-based hydrocarbon resins featuring very low color, high chemical resistance and stability in weathering conditions. These hydrocarbon resins may be used in coating formulations, or in polymer product compositions that are intended to resist intense exposure to natural light. Alternatively, the hydrogenation process can also be done after the reaction between any type of CNSL stream and hydrocarbon vinyl monomers under similar conditions.

Any aforementioned CNSL-based hydrocarbon resins can be chemically modified afterwards, to attain special desirable features. As part of this disclosure, the carbon double bonds on the side chains of the cardanol in the aforementioned CNSL-based hydrocarbon resins can be epoxidized with hydrogen peroxide, or organic peroxides, or a combination of hydrogen peroxide and organic carboxylic acids. The degree of epoxidation can be selectively controlled by the reaction conditions, and by adjusting the substrate to peroxide feed ratios. These epoxidized CNSL-based hydrocarbon resins are suitable for lubricant compositions. The side double bonds can also be fully brominated with molecular bromine or other suitable organic and inorganic brominating agents, to produce resins with flame retardant characteristics.

Other common phenols can also be incorporated in hydrocarbon resins along with the CNSL to make resins comprised of variable amounts of CNSL building block in the final resin. These modifications may be useful for enhancement of specific desirable features. For instance, addition of bisphenol-A to the reaction mixture produces resins with high glass transition temperature. Lighter color, anti-oxidant properties, and light stability are other common enhanced features that can be achieved by the addition of about 2-70% by weight, and preferably 5-50%, 5-40%, 5-30% or 5-20% by weight of other simple synthetic phenols prior to or during the reaction of CNSL with the hydrocarbon vinyl monomers to make the respective blend of the desired CNSL and phenol based hydrocarbon resins. Examples of suitable phenols include, but are not limited to: phenol, nonylphenol, ortho-tert-butylphenol, para-tert-butylphenol, ortho-cresol, para-cresol, meta-cresol, technical grade mixture of cresols, bisphenol-A, bisphenol-F, hydroquinone, resorcinol, catechol, butylhydroxytoluene, methoxyphenol, tert-butylcatechol.

Suitable vinyl hydrocarbon monomers used in the manufacture of CNSL-based hydrocarbon resins are preferably the aromatic vinyl monomers, in which one or multiple alkene groups are linked directly to an aromatic hydrocarbon group, or to multiple aromatic groups that can be fused together or linked by single carbon-carbon bonds. Examples include, but are not limited to, styrene, alpha-methylstyrene, vinyltoluene (mixture of ortho, meta, and para isomers), indene, indene-coumarone streams from coal tar distillation, alpha-vinylnaphthalene, diisopropenylbenzene (and respective mixture of ortho- meta- and para-disubstituted isomers), the C9 fraction from a petroleum cracking process, divinylbenzene, and mixtures of divinylbenzene and ethylvinylbenzenes. Aliphatic and cycloaliphatic vinyl monomers can also be used alone or in a mixture with aromatic vinyl monomers. Examples of suitable aliphatic and cycloaliphatic hydrocarbon vinyl monomers include, but are not limited to, isobutylene, butadiene, isoprene, pentadiene, cyclopendadiene, dicyclopentadiene, pinenes (alpha and beta isomers), limonene, cyclohexane, vinylcylohexane, and mixtures of unsaturated olefins from the so called "C5 fraction" originated from oil refineries.

Suitable catalysts for the preparation of CNSL-based hydrocarbon resins may be strong inorganic protic acids, including, but not limited to, sulfuric acid, hydrofluoric acid, hexaflyorophosphoric acid, tetrafluoroboric acid, perchloric acid, or a mixture thereof. Lewis acids are also another good alternative to the inorganic protic acids, as they are very effective promoting Friedel-Crafts reactions, and similar alkylation reactions of phenols. Examples of suitable catalysts include, but are not limited to: boron trifluoride, boron trichloride, and respective complexes with phenol, alcohols, or tetrahydrofuran; zinc chloride, aluminum chloride, titanium (III) chloride, titanium (IV) chloride, zirconium (III) chloride, zirconium (IV) chloride, aluminum trichloride, aluminum phenoxide, reaction product of activated aluminum powder and CNSL. Boron trifluoride and respective complexes are the most preferred among the suitable Lewis acid catalysts because of their volatility, which simplify the procedure of catalyst removal from the finished product. A highly preferred catalyst class is the organic sulfonic acids, due to their moderate strength and activity to promote the reaction between CNSL-streams and vinyl hydrocarbon monomers. In addition, organic sulfonic acids are widely commercially available in high purity, they are relatively low cost, and pose less hazardous conditions on handling. More specifically, in respect to the manufacturing processes involving CNSL streams, organic sulfonic acids offer the best reaction control, with minimal side reactions, and better product composition uniformity. Examples of suitable organic sulfonic acids are, but not limited to, benzensulfonic acid; ortho-isomer, or para-isomers of toluenesulfonic acid, or mixture thereof; alpha-isomer, or beta-isomer of naphthalenesulfonic acid, and mixtures thereof; 1,5-isomer, or 2,6-isomer of naphthalenedisulfonic acid, and mixtures thereof; nonylphenolsulfonic acid, and mixture of respective isomers; dinonylnaphthylsulfonic acid, and mixture of respective isomers; dodecylbenzenesulfonic acid, methanesulfonic acid; trifluoromethanesulfonic acid, laurylsulfonic acid; phenolsulfonic acid and respective isomers; cresylsulfonic acid, and respective isomers. Preferably, all of the aforementioned sulfonic acids should have about 50-100% purity, and more preferably about 95.00-99.99% purity. The crystallized hydrate state of all of the aforementioned sulfonic acids are also suitable catalysts for the manufacture of CNSL-based hydrocarbon resins.

Solid state or supported acid catalysts are also suitable to promote the reaction between the aforementioned purified and non-purified CNSL and vinyl hydrocarbon monomers. These solid catalysts are insoluble in the reaction media, and generally they are in the form of microbeads, or coarse particulates, which are designed to have high surface area, improving the conversion rate. The major advantage of these catalysts relates to the simplification of the process for extraction of the acid catalyst from the final product by a simple filtration procedure. Conversely, soluble organic catalysts, in general, require neutralization, and subsequent wash and filtration steps, which can increase the time and cost of the manufacturing process. These catalysts are very well suited for semi-batch or continuous manufacturing processes for the production of CNLS-based hydrocarbon resins. Examples of suitable solid state or supported acid catalysts include, but are not limited to, nafion resins, sulfonated poly(styrene-co-divinylbenzene) resins, sulfuric aciddoped silica powder, acid activated montmorillonite, activated acid fullers earth, zeolite Y hydrogen form, zeolite ZSM-5 hydrogen form, zeolite beta hydrogen form, Zeolite mordenite hydrogen form, and acid activated bentonite clays.

The type and the amount of catalyst to be used in the manufacturing of CNSL-based hydrocarbon resins should be carefully selected based on the reactivity of the substrates, and the desired specification of the finished product. CNSL has the propensity to self-polymerize under the influence of strong acid catalysts at high temperatures. Therefore, under these conditions, the resulting CNSL hydrocarbon resin may exhibit high polymer fraction content as a consequence of these side reactions, which will result in high viscosity of finished products. Very low levels of acid catalyst are not satisfactory, because the conversion rate becomes very slow. In addition, the reactivity of the batch can be seriously compromised by the possibility of reaction inhibition (quenching) caused by small unpredictable and unwanted impurities. For strong inorganic and Lewis acid catalysts, which exhibit the higher catalytic activity, the optimal catalyst level is about 0.01 to 1.00% of the total weight of the reactants, and preferably about 0.05 to 0.2% of the total weight. In certain embodiments, the level of strong inorganic acid catalyst or Lewis acid catalyst is about 0.01%, 0.05%, 0.10%, 0.20%, 0.30%, 0.40%, 0.50%, 0.60%, 0.70%, 0.80%, 0.90% or 1.00% of the total weight of the reactants. Any of these values may be used to define a range for the percentage of the strong inorganic acid catalyst or Lewis acid catalyst. For example the percentage of the strong inorganic acid catalyst or Lewis acid catalyst may range from about 0.05% to about 0.5%, or from about 0.1% to about 0.5% of the total weight of the reactants. In the case of sulfonic acids, which exhibit moderate catalytic activity, the optimal catalyst level is about 0.05 to 5.0% of the total weight of the reactants, and preferably about 0.3 to 1.0% of the total weight.

Figure 2:
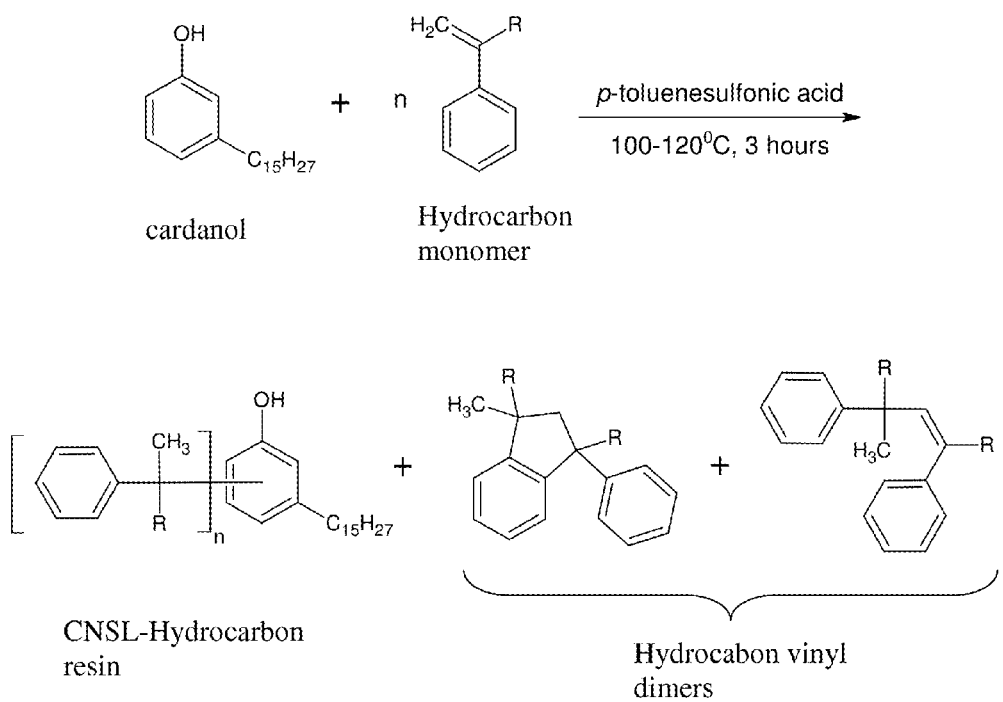
FIG. 2 illustrates generally the reaction mechanism for one embodiment of the disclosure.

FIG. 2 illustrates generally the reaction mechanism for one embodiment of the disclosure. As shown in FIG. 2, cardanol may be combined in a reactor vessel with a hydrocarbon monomer in the presence of p-toluenesulfonic acid. The reactor vessel is maintained at a temperature of between 100-120° C. for a period of about 3 hours. The cardanol and hydrocarbon monomers react to form a CNSL hyrocarbon resin.

Prior to or after the production of CNSL-based hydrocarbon resins, certain additives can be added to attain certain desirable properties, or for better control of the manufacturing process, or to control the intended specifications of the final product.

The molar ratio between the CNSL and the vinyl hydrocarbon resin plays a significant role on the physico-chemical properties of the resulting resin. More importantly, it can deeply influence the performance of the resin for the intended application. Low [vinyl hydrocarbon monomer]/[CNSL] molar ratio ranges, such as about 0.8 to 1.8, produce resins with the lowest viscosity, with good compatibility with a variety of resins and polymer formulations, but reduced color and weathering stability. Medium [vinyl hydrocarbon monomer]/[CNSL] molar ratio ranges, such as about 1.8 to 3.0, produce resins with intermediate to high viscosity, but they exhibit enhance compatibility, color and weathering stability. High [vinyl hydrocarbon monomer]/[CNSL] molar ratio ranges, such as above about 3.0, produce resins with high to very high viscosity, and they may exhibit reduced compatibility or phase stability with other resins and polymer formulations, but they have excellent color and weathering stability, and enhanced anti-oxidant properties.

In certain embodiments, the molar ratio of the vinyl hydrocarbon monomer to the CNSL in the reaction mixture is about 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 6.0, 7.0, 8.0, 9.0 or 10.0. Any of these values may be used to define a range for the molar ratio of the vinyl hydrocarbon monomer to the CNSL wherein the properties of the different embodiments may have more than one property associated with more than one molar ratio range. For example, the molar ratio of the vinyl hydrocarbon monomer to the CNSL may range from about 0.8 to 10.0 or about 0.8 to 3.0.

The reaction between CNSL and vinyl hydrocarbons is carried out in sealed reactors in batch, semi-batch or continuous modes, protected from exposure to air, and preferably blanketed with an inert or reducing atmosphere. The temperature of reaction is a function of the reactivity of the CNSL, the vinyl hydrocarbon monomer, and the activity of the acid catalyst. For example, when the vinyl monomer is an aliphatic type and a Lewis acid catalyst is used, the temperature range for the process may range from about −10° C. to about 90° C., and is preferably between about 40° C. to about 60° C. When the vinyl monomer is an aromatic type and a Lewis acid catalyst is used, the temperature range for the process may range from about −10° C. to about 90° C., and is preferably between about 20° C. to about 60° C. When the vinyl monomer is an aromatic type and an inorganic acid or sulfonic acid catalyst is used, the temperature range for the process may range from about 50° C. to about 150° C., and is preferably between about 100° C. to about 120° C.

Even for the combination of substrates with the lowest reactivity, an exothermic reaction is observed at early stages of conversion. As the reactivity of the substrates increase, the temperature of the reaction must be adjusted to avoid side reactions due to temperature spikes, and the possibility of runaway reaction at early stages of conversion. The CNSL streams with relatively higher content of cardol exhibit higher reactivity. The less sterically hindered aromatic vinyl hydrocarbon monomers are the most reactive ones. Cycloaliphatic and aliphatic vinyl hydrocarbon monomers exhibit very low reactivity toward CNSL, and for such combination, high catalytic activity is required to achieve adequate conversions. For instance, for the reaction between any afore mentioned CNSL streams and styrene or vinyltoluene, the ideal temperature range for high active catalysts, such as boron trifluoride-phenol complex, the ideal reaction temperature is in the range of about −10° to 90° C., and preferably from about 40° to 60° C. For this same combination, but using para-toluenesulfonic acid monohydrate, the ideal reaction temperature is in the range of about 50° to 150° C., and preferably from about 100° to 120° C.

In certain embodiments the temperature for the reaction between CNSL and vinyl hydrocarbons is about −10° C., 0° C., 10° C., 20° C., 30° C., 40° C., 50° C., 60° C., 70° C., 80° C., 90° C., 100° C., 110° C., 120° C., 130° C., 140° C., or 150° C. Any of these values may be used to define a range for the temperature for the reaction between CNSL and vinyl hydrocarbons. For example, the temperature may range from about −10° C. to about 150° C., about 50° C. to about 150° C., or about 100° C. to about 150° C.

One embodiment of the process for carrying out the reaction between CNSL and the vinyl hydrocarbon monomer comprises dispersing the catalyst into the CNSL, followed by slow and controlled addition of the vinyl monomer into the CNSL/catalyst mixture.

A second embodiment of the process comprises adding at the same time the catalyst and the vinyl monomer through two different inlet ports (to avoid premature mixing of the catalyst with the vinyl monomer).

A third embodiment comprises dispersing the vinyl monomer into the CNSL, and then slowly adding the catalyst, or a suitable catalyst dispersion, with mixing. In this specific case, at early stages of conversion, the temperature should be significantly lower than the optimal level to avoid any potential temperature spikes or runaway reaction.

In each of the embodiments described above, the temperature is maintained in the ranges discussed above depending upon the type of vinyl monomer and the type of catalyst used.

In another embodiment, CNSL hydrocarbon epoxy resins, specifically glycidyl ethers of the aforementioned CNSL hydrocarbon resins, can be made from the reaction between epichlorohydrin and the desired CNSL hydrocarbon resin promoted by strong bases, such as sodium hydroxide or potassium hydroxide. CNSL hydrocarbon epoxy resins enhances the flexibility, and toughening characteristics of epoxy curing compositions, such as protective coatings, adhesives, and composites, without compromising the mechanical properties, compatibility, weather and chemical resistance. This feature makes them very advantageous over the traditional long aliphatic glycidyl ethers, which also promotes good flexibility, and toughening characteristics but at expense of reduced overall performance.

As noted in previous inventions [Process for manufacture of glycidyl ethers of polyhydric phenols, U.S. Pat. No. 2,801,227 A; and Preparation of liquid epoxy resins from bisphenols, U.S. Pat. No. 4,132,718 A], the use of a large stoichiometric excess of epichlorohydrin, and controlling the amount of water and the pH in the reaction medium also play a crucial role in minimizing side reactions that lead to significant amounts of undesirable inactive side products, high viscosity, low epoxy equivalent weight values, and high concentration of compounds with hydrolysable chlorine fragments.

Alternatively, CNSL hydrocarbon epoxy resins can be made from the epoxidation reaction of the allyl ethers of the desired CNSL hydrocarbon resin with inorganic or organic peroxides, or mixtures of hydrogen peroxide and carboxylic acids, such as acetic or formic acids. In turn, the referred allyl ethers of CNSL hydrocarbon resins can be made by the reaction between any aforementioned CNSL hydrocarbon resin and allyl chloride promoted by inorganic bases, such as sodium hydroxide or potassium hydroxide. Allyl bromide and allyl iodide are also suitable and more reactive alternatives to allyl chloride. The epoxidation of CNSL hydrocarbon resin allyl ethers may occur not only on the intended allyl group, but the unsaturations of the side chain can also be epoxidized all together. The allyl ether groups are more reactive, and hence more prone to epoxidation by organic and inorganic peroxides than the side chain double bonds of the CNSL building blocks. Therefore the degree of epoxidation can be controlled by the reaction conditions and the stoichiometric ratio of the reactants.

In another embodiment, alkoxylated CNSL hydrocarbon epoxy resins can be made from the reaction between any aforementioned CNSL hydrocarbon resin and an alkelene or cycloalkelene oxide promoted by acid or base catalysts under high temperature and pressure. The resulting alcohol or polyol are suitable for the 1-part or 2-part polyurethane systems used in semi-flexible and rigid foams, building materials, and adhesives. These polyurethane-polyols systems are very hydrophobic, and exhibit good mechanical behavior that is comparable to a great number of conventional aromatic polyether polyesters, in addition to improved impact resistance and flexibility. Examples of alkelene oxide include, but not limited to, ethylene oxide, propylene oxide, cyclohehane oxide, dicyclopentadiene diepoxide, and styrene oxide. The process for alkoxylation of CNSL hydrocarbon epoxy resins involves slow addition of alkelenes oxides to a mixture of CNSL hydrocarbon resin and catalyst at temperature in between 80 and 220° C., more preferably between 150 and 180° C., and under pressure of 10-150 psi, more preferably between 30-75 psi, and catalyzed by inorganic base, such as sodium hydroxide, or potassium hydroxide. The stoichiometric ratio between CNSL hydrocarbon resin and the alkelene oxide is judiciously chosen based on the desirable amount of alkelene oxide monomeric units appended to the hydroxyl groups of CNSL hydrocarbon resin. Large alkelene oxide to CNSL hydrocarbon resin equivalent ratios produce resins with long chains of polyalkene oxide appended to the CNSL hydrocarbon resins, which may render surfactant properties to the final product. Hence, surfactant is suitable for pigment dispersion aid, and rheology modifier in paint formulations.

Alternatively, ethoxylated or propoxylated CNSL hydrocarbon polyol resins can be made by reacting any aforementioned CNSL hydrocarbon resin with ethylene carbonate or propylene carbonate respectively, using the similar established manufacturing procedure for ethoxylated of plain cardanol [Cardanol derivative and method of making the cardanol derivative EP 1137620 A1]. This reaction is catalyzed by an organic or inorganic base. This procedure offers an advantage over traditional alkoxylation with organic oxides because it can be run at normal pressure, which simplifies the basic manufacturing equipment requirements. The most commonly catalysts employed for this specific mechanism of alkoxylation reactions are volatile organic amines, because they are very effective, and they can be easily removed from the reaction product by simple vacuum distillation. The reaction between CNSL hydrocarbon resin and ethylene or propylene carbonate is conducted at 100-220° C., more preferably between 150-180° C., and the amount of catalyst is generally between 0.1 to 10% of the total charge of reactants, but more preferably between 1-3%.

The following examples provide exemplary embodiments of the present invention, and the examples are not intended to limit the scope of the invention in any way.

EXAMPLES

Example 1

Pure CNSL—Alphamethylstyrene Resin

A 1 L round bottom multi-neck glass flask, equipped with a thermometer, a condenser, a mechanical stirrer, and an inlet port controlled by a peristaltic pump, was charged with 300 g or 1.0 mol of distilled CNSL (NX-4708M, Cardolite Co.). The whole set up was continually purged with a gentle flow of pure dry nitrogen. The temperature of the flask contents was raised to 80° C., and then 3.0 g of pure para-toluenesulfonic acid were added to the flask. Upon dispersion of the acid catalyst, 300 g or 2.54 mol of alpha-methylstyrene (Acros Chemicals Co, 98% pure) were added to the reaction mixture via the peristaltic pump, while the content of the flask was vigorously stirred. As soon as the addition started, the temperature was allowed to slowly rise up to 120° C. The addition rate of the styrene was adjusted to take about 15 minutes to completion. Then, the reaction mixture was allowed to react for an additional 120 minutes. The non-reacted alpha-methylstyrene was vacuum distilled using an oil pump, at 0.05 mmHg. The resin was dispensed as is without any further purification step.

The yield was 552 g of resin having the following properties: Brookfield Viscosity (300 rpm, 25° C., spindle #3)=358 cPs; Gardner color=10; free alpha-methylstyrene (by GC)=0.04%; free cardanol (by HPLC)=4.7%

Example 2

Hydrogenated CNSL—Vinyltoluene Resin

A 1 L round bottom multi-neck glass flask, equipped with a thermometer, a condenser, a mechanical stirrer, and an inlet port controlled by a peristaltic pump, was charged with 304 g or 1.0 mol of hydrogenated and distilled CNSL (NC-510, Cardolite Co.). The whole set up was continually purged with a gentle flow of pure dry nitrogen. The temperature of the flask contents was raised to 80° C., and then 3.0 g of pure para-toluenesulfonic acid were added to the flask. Upon dispersion of the acid catalyst, 312 g or 3.0 mol of vinyltoluene (Acros Chemicals Co, 98%, mixture of isomers) were added to the reaction mixture via the peristaltic pump, while the content of the flask was vigorously stirred. As soon as the addition started, the temperature was allowed to rise up to 120° C. The addition rate of the vinyltoluene was adjusted to take about 15 minutes to completion. Then, the reaction mixture was allowed to react for an additional 60 minutes. The non-reacted vinyltoluene was vacuum distilled using an oil pump, at 0.05 mmHg. The resin was dispensed as is without any further purification step.

The yield was 605 g of resin having the following characteristics: Brookfield Viscosity (300 rpm, 25° C., spindle #3)=2640 cPs; Gardner color=<1; free styrene (by GC)=0.04%; free hydrogenated cardanol (by HPLC)=0.25%

Example 3

Ultra-High Pure CNSL—Styrene Resin

A 500 mL round bottom multi-neck glass flask, equipped with a thermometer, a condenser, a mechanical stirrer, and an inlet port controlled by a peristaltic pump, was charged with 150 g or 0.5 mol of highly purified CNSL with cardol content lower than 0.1% (GX-2512, Cardolite Co.). The whole set up was continually purged with a gentle flow of pure dry nitrogen. The temperature of the flask contents was raised to 80° C., and then 1.5 g of pure para-toluenesulfonic acid were added to the flask. Upon dispersion of the acid catalyst, 104 g or 1.0 mol of Styrene (Acros Chemicals Co, 99.9% pure, stabilized with 0.1% TBC) were added to the reaction mixture via the peristaltic pump, while the content of the flask was vigorously stirred. As soon as the addition started, the temperature was allowed to rise up to 100° C. The addition rate of the styrene was adjusted to take about 45 minutes to completion. Then, the reaction mixture was allowed to react for an additional 90 minutes. The non-reacted styrene was vacuum distilled using an oil pump, at 0.05 mmHg. Then, a solution of 2.0 g of sodium bicarbonate (Acros Chemicals Co) in 50 mL of distilled water were added to neutralize the catalyst. The waste was vacuum distilled, and the resulting hazy oil was treated with filtration aid ceramic and filtered through a fritted funnel under vacuum.

The yield was 232 g of resin having the following properties: Brookfield Viscosity (300 rpm, 25° C., spindle #3)=455 cPs; Gardner color=3; free styrene (by GC)=0.07%; free cardanol (by HPLC)=1.9%

Example 4

Pure CNSL—Divinylbenzene Resin

A 1 L round bottom multi-neck glass flask, equipped with thermometer, a condenser, a mechanical stirrer, and an inlet port controlled by a peristaltic pump, was charged with 300 g or 1.0 mol of distilled CNSL (NX-4708, Cardolite Co.). The whole set up was continually purged with a gentle flow of pure dry nitrogen. The temperature of the flask contents was raised to 100° C., and then 2.5 g of pure para-toluenesulfonic acid were added to the flask. Upon dispersion of the acid catalyst, 195 g or 1.5 mol of Divinylbenzene (TCI America Co, mixture of meta-, and para-isomers, also containing 40% ethylvinylbenzene) were added to the reaction mixture via the peristaltic pump, while the content of the flask was vigorously stirred. As soon as the addition started, the temperature was allowed to rise up to 140° C. The addition rate of the divinylbenzene was adjusted to take about 30 minutes to completion. Then, the reaction mixture was allowed to react for an additional 30 minutes. The non-reacted vinyl monomers were vacuum distilled using an oil pump, at 0.05 mmHg. The resin was dispensed as is without any further purification step.

The yield was 485 g having the following characteristics: Brookfield Viscosity (100 rpm, 25° C., spindle #3)=6035 cPs; HPLC/GPC results: Mn=1,384 g/mol, Mw=2,241 g/mol, polymer dispersity=1.62; free cardanol=0.8%.

Example 5

Glycidyl Ethers of CNSL Hydrocarbon Resin

A 1000 mL round bottom multi-neck glass flask, equipped with a thermometer, a condenser, a mechanical stirrer, and an inlet port with a addition funnel with pressure equalizer feature, was charged with 336 g (1 equivalent-weight. based on hydroxyl group content) of styrenated ultra-high pure CNSL resin described in example 3, and 222 g (4 equivalent-weight) of epichlorohydrin, and the resulting mixture was stirred for stirred and warmed up to 65° C. in 30 minutes. Then, 52.8 g (1 equivalent weight) of a 50% by weight solution of sodium hydroxide in water were added via the addition funnel over 3 hours period. Meanwhile the water-epichlorohydrin azeotrope from the reaction mixture was distilled under vacuum at 150-170 mmHg out to a Dean-Stark trap, in which the condensed epichlorohydrin-water heterogenous mixture was decanted, and the epichlorohydrin layer was allowed to return to the reaction flask. Upon completion the addition of epichlorohydrin, the reaction mixture was stirred at 68-72 hours for one additional hour. Then, the excess of epichlorohydrin was removed from the reaction mixture by vacuum distillation at 70-90° C. and 100 mmHg. The resulting thick slurry was then extracted with a mixture of 100 g of xylenes and 100 g of water. The aqueous phase was decanted out, and the organic phase was filtered and evaporated under vacuum to remove xylenes. The resulting light color oil was then filtered through a short plug of Celite filtration aid.

The yield was 365 g having the following characteristics: Brookfield Viscosity (100 rpm, 25° C., spindle #3)=609 cPs; Gardner color=6; Epoxy equivalent weight=618, hydrolizable chlorine content=0.18%.

Example 6

Ethoxylated CNSL Hydrocarbon Resin

A 1000 mL round bottom multi-neck glass flask, equipped with a thermometer, a condenser, and a mechanical stirrer, was charged with 336 g (1 equivalent-weight. based on hydroxyl group content) of styrenated ultra-high pure CNSL resin described in example 3, and 4.9 g (0.08 equivalent-weight) of triethylamine as a catalyst, and the resulting mixture was stirred under nitrogen and heated up to 155° C. Then, 58.1 g (1.1 equivalent weight) of molten ethylene carbonate were added to the flask over 3 hours period. Once completed the addition, the batch was stirred for another hour at 155° C., followed by vacuum distillation at 80-85° C. and 100 mmHg to remove any unreacted ethylene carbonate and triethylamine.

The yield was 362 g having the following characteristics: Brookfield Viscosity (100 rpm, 25° C., spindle #3)=655 cPs; Gardner color=7; Hydroxyl value=109 mgKOH/g.

Example 7

Application

The ability of CNSL hydrocarbon resin (from Example 3) to reduce the viscosity of liquid epoxy at different concentrations was investigated (e.g., viscosity reduction property). Six systems were tested in which the percentage of CNSL hydrocarbon resin in Epon 828 was 5%, 10%, 15%, 20%, 25% or 30%. The viscosities of the six systems were measured by using a CAP 2000+VISCOMETER (BYK). Similar systems using a commercial phenol-hydrocarbon resin were tested for comparison.

Figure 3:
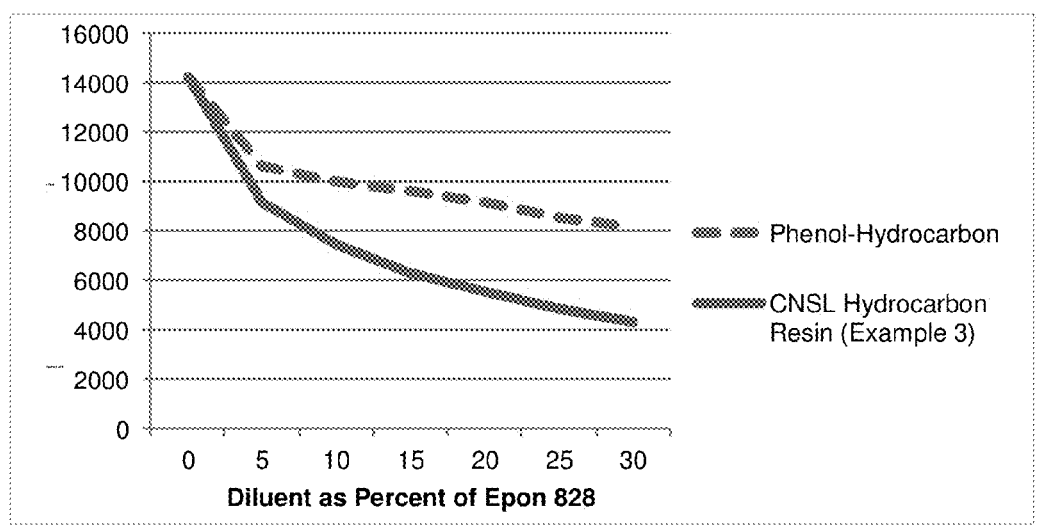
FIG. 3 shows the effect of different concentrations of a commercial phenol-hydrocarbon resin and CNSL hydrocarbon resin on the viscosity of a liquid epoxy.

As shown in Table 1 below and FIG. 3, use of CNSL hydrocarbon resin as a diluent resulted in a greater reduction in viscosity of the liquid epoxy in comparison to the commercial phenol-hydrocarbon resin.

TABLE 1

Viscosities of Liquid Epoxy and Hydrocarbon Resin Blends

| Percentage of hydrocarbon resin in liquid epoxy | Viscosities of liquid epoxy and hydrocarbon resin blends @25° C./cps | |
|---|---|---|
| | With commercial phenol-modified hydrocarbon resin | With CNSL hydrocarbon resin (from Example 3) |
| 0% | 14280 | 14280 |
| 5% | 10650 | 9165 |
| 10% | 10031 | 7512 |
| 15% | 9638 | 6313 |
| 20% | 9150 | 5575 |
| 25% | 8588 | 4853 |
| 30% | 8156 | 4313 |

Investigation of Persoz hardness development was performed on a clear coating system (no pigment, additive and solvent added). A liquid epoxy Epon 828 and curing agent Versamid 115×70 system was used at stoichiometric ratio. 30% CNSL hydrocarbon resin or phenol-hydrocarbon resin (based on the weight of liquid epoxy) was evaluated.

For the Persoz hardness measurement, the testing panels were prepared by a BYK 15 Mirs wet application bar over QD-36 cold rolled steel panels (Q-panel, 3"×6"×0.020"). Persoz hardness numbers were obtained by using a Pendulum hardness tester (BYK Gardner) based on ASTM D 4366.

As shown in Table 2 below, the Persoz hardness results indicated that the system with 30% CNSL hydrocarbon resin gave faster cure property in comparison to the one with commercial hydrocarbon resin.

TABLE 2

Persoz hardness development of different systems at 25° C. cure condition

| Cure time @ 25° C./day | Persoz hardness/sec. | |
|---|---|---|
| | With commercial phenol-modified hydrocarbon resin | With CNSL hydrocarbon resin (from Example 3) |
| 2 | 30 | 40 |
| 5 | 125 | 149 |
| 9 | 168 | 187 |

The adhesion tape test (ASTM D 3359-97) was performed on rusted S-36 panels (Q-panel, 3"×6"0.020") (adhesion over rust metal substrate). To obtain a uniform rusted surface, the clean S-36 panels were immersed in a 60° C. water bath (Precision circulating water bath, Model 260) for 24 hours followed by a warm tap water rinsing to remove the loosened rust. The panels were roughly dried with a paper towel and stored at room temperature for seven days before use.

TABLE 3

Pigmented white epoxy base formulation

| Composition | Gray epoxy base (grams) |
|---|---|
| Liquid epoxy | 30 |
| CNSL hydrocarbon resin (from Example 3) | 6 |
| Dispersant | 3 |
| Extender | 65 |
| pigment | 13 |

TABLE 3-continued

Pigmented white epoxy base formulation

| Composition | Gray epoxy base (grams) |
| --- | --- |
| Solvent | 7.5 |
| Flow control | 0.6 |
| Total of white epoxy base | 125.1 |
| Curing agent | 44.7 |

Figure 4:
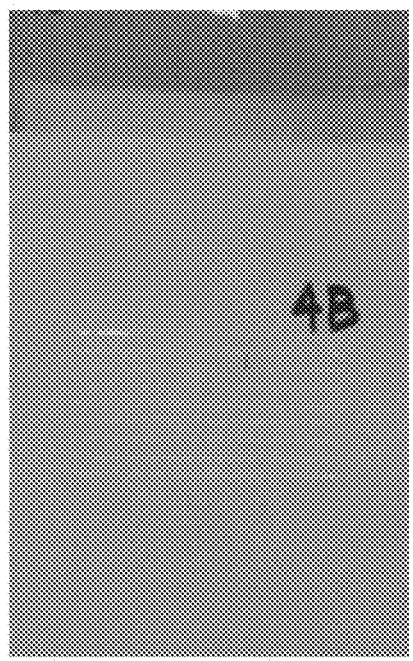
FIG. 4 shows the results of a cross-hatch adhesion test on rusted S-36 panels treated with a pigmented white epoxy base formulation comprising CNSL hydrocarbon resin.

Pigmented systems were applied over the rusted panels via a 10 Mirs wet application bar. After a seven-day room temperature cure, the cross hatch adhesion test was performed. As shown in FIG. 4, there was 100% adhesion with no failure. The addition of CNSL hydrocarbon resin to coating system gave good adhesion property to rust metal substrate.

Figure 5:
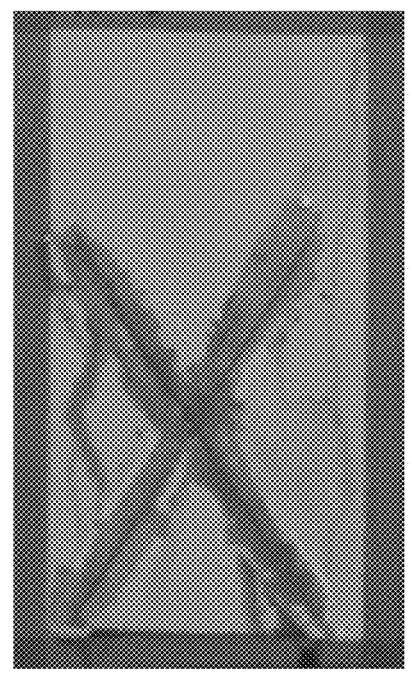
FIG. 5 shows a tested panel image of CNSL hydrocarbon system after 668 hours salt spray exposure.

Salt spray exposure (ASTM B117) was evaluated based on the same formulation shown in Table 3 (anti-corrosion property). As shown if FIG. 5, after 668 hours salt spray exposure, the test panel with 20% CNSL hydrocarbon resin exhibited no rust underneath the coating film except for a few small blisters near the scribed lines.

The invention claimed is:

1. A resin comprising:
   a) about 20% to about 95% by weight of vinylated cardanols and vinylated cardols; and
   b) about 1% to about 40% by weight of hydrocarbon cyclic dimers.

2. The resin of claim 1, further comprising about 1% to about 50% by weight of one or more additional polymers.

3. The resin of claim 2, wherein the one or more additional polymers are linear chains composed of vinyl hydrocarbon monomers or cardanol polymers.

4. The resin of claim 3, wherein the linear oligomers have a degree of polymerization of no less than 2 and no more than 10 repeating monomer units.

5. A reaction mixture comprising:
   a) Cashew Nut Shell Liquid (CNSL); and
   b) a vinyl hydrocarbon.

6. The reaction mixture of claim 5, further comprising an acid catalyst.

7. The reaction mixture of claim 6, wherein the acid catalyst is a Lewis acid.

8. The reaction mixture of claim 5, wherein the vinyl hydrocarbon is an aliphatic vinyl monomer or an aromatic vinyl monomer.

9. The reaction mixture of claim 6, wherein the vinyl hydrocarbon is an aromatic vinyl monomer and the acid catalyst is an inorganic acid or a sulfonic acid.

10. The reaction mixture of claim 6, wherein the vinyl hydrocarbon is alpha-methylstyrene acid and the catalyst is para-toluenesulfonic acid.

11. A process for manufacturing a Cashew Nut Shell Liquid (CNSL) hydrocarbon resin comprising the steps of:
   (a) adding to a reactor vessel a quantity of CNSL;
   (b) adding an acid catalyst to the CNSL;
   (c) adding a vinyl hydrocarbon monomer to the acid catalyst and CNSL; and
   (d) maintaining the reactor vessel at a predetermined temperature for a predetermined period of time, thereby producing the CNSL hydrocarbon resin.

12. The process of claim 11, wherein the acid catalyst is a Lewis acid.

13. The process of claim 11, wherein the vinyl hydrocarbon monomer is an aliphatic vinyl monomer or an aromatic vinyl monomer.

14. The process of claim 12, wherein the vinyl hydrocarbon monomer is an aromatic vinyl monomer and the catalyst is an inorganic acid or a sulfonic acid.

15. The process of claim 12, wherein the vinyl hydrocarbon monomer is alpha-methylstyrene and the catalyst is para-toluenesulfonic acid.

16. The process of claim 11, further comprising catalytically reducing the CNSL with hydrogen under pressure and in the presence of an active metal catalyst prior to adding the CNSL to the reactor vessel.

17. The process of claim 11, further comprising reacting the CNSL hydrocarbon resin with an aldehyde or ketone to form a CNSL-novolac resin.

18. The process of claim 11, further comprising reacting the CNSL hydrocarbon resin with epichlorohydrin in the presence of a base to produce a glycidyl ether of the CNSL hydrocarbon resin.

19. The process of claim 11, further comprising reacting the CNSL hydrocarbon resin with an alkelene or cycloalkelene oxide in the presence of an acid or base catalyst under high temperature and pressure to produce an alkoxylated CNSL hydrocarbon epoxy resin.

20. The process of claim 11, further comprising reacting the CNSL hydrocarbon resin with ethylene carbonate or propylene carbonate in the presence of an organic or inorganic base.

21. The process of claim 11, further comprising reducing the CNSL hydrocarbon resin with pressurized hydrogen in the presence of a catalyst.

22. The process of claim 11, wherein the molar ratio of the vinyl hydrocarbon monomer and the CNSL is from about 0.8 to about 5.0.

23. The process of claim 11, wherein the temperature is from about −10° C. to about 150° C.

* * * * *